United States Patent
Kantschuk et al.

(10) Patent No.: US 7,187,711 B1
(45) Date of Patent: Mar. 6, 2007

(54) MODEM WAKE-UP IN SUPPORT OF CROSS-TALK CANCELLATION IN A MODEM POOL ENVIRONMENT

(75) Inventors: Amir Kantschuk, Ramat Gan (IL); Dan Goren, Ramat Gan (IL); Sharon Peleg, Hod Hasharon (IL); Maya Bar-El, Petah Tikva (IL)

(73) Assignee: Actelis Networks Ltd., Fremont, CA (US)

(*) Notice: Subject to any disclaimer, the term of this patent is extended or adjusted under 35 U.S.C. 154(b) by 1122 days.

(21) Appl. No.: 09/721,759

(22) Filed: Nov. 27, 2000

Related U.S. Application Data (63) Continuation-in-part of application No. 09/510,550, filed on Feb. 22, 2000.

(60) Provisional application No. 60/121,228, filed on Feb. 23, 1999.

(51) Int. Cl.
H04B 1/38 (2006.01)

(52) U.S. Cl. ............... 375/222; 375/285; 370/201; 379/417

(58) Field of Classification Search ........ 375/222, 375/259, 260, 285, 346, 350, 377; 370/201; 379/417
See application file for complete search history.

(56) References Cited

U.S. PATENT DOCUMENTS

| | | | |
|---|---|---|---|
| 5,825,753 A | 10/1998 | Betts et al. | 370/289 |
| 5,887,032 A * | 3/1999 | Cioffi | 375/257 |
| 5,970,088 A | 10/1999 | Chen | 375/222 |
| 6,160,790 A | 12/2000 | Bremer | 370/201 |
| 6,201,796 B1 * | 3/2001 | Agazzi et al. | 370/286 |
| 6,633,894 B1 | 10/2003 | Cole | 708/300 |
| 6,687,288 B1 | 2/2004 | Shteiman | |

OTHER PUBLICATIONS

U.S. Appl. No. 09/510,550, filed Feb. 22, 2000, Barlev et a.

* cited by examiner

*Primary Examiner*—Khai Tran
*Assistant Examiner*—David B. Lugo
(74) *Attorney, Agent, or Firm*—Pearl Cohen Zedek Latzer LLP (57) ABSTRACT

In a communications system having a first modem pool for communicating with a second modem pool, each modem pool including a plurality of modems and having at least one NEXT cancellation filter, a method for modem wake-up including the steps of, during a first time period, a) activating at least one of the modems in the first modem pool, b) deactivating at least one of the modems in the second modem pool, for at least one target modem in the first modem pool c) activating the first modem pool NEXT canceller filter, d) measuring the NEXT transfer function for the target modem and at least one other disturber modem in the first modem pool, and, during a second time period, e) activating at least one of the modems in the second modem pool, f) deactivating at least one of the modems in the first modem pool, for at least one target modem in the second modem pool g) activating the second modem pool NEXT canceller filter, and h) measuring the NEXT transfer function for the target modem and at least one other disturber modem in the second modem pool.

37 Claims, 4 Drawing Sheets

MODEM WAKE-UP IN SUPPORT OF CROSS-TALK CANCELLATION IN A MODEM POOL ENVIRONMENT

CROSS REFERENCE TO RELATED APPLICATIONS

This application is a Continuation-In-Part application of U.S. patent application No. 09/510,550 filed Feb. 22, 2000, and entitled "High Speed Access System Over Copper Cable Plant," that claims priority from U.S. Provisional Application Serial No. 60/121,228, filed Feb. 23, 1999, and entitled "Access Express-Very High Data Rate Communication Channels Over Copper," both hereby incorporated by reference in their entirety.

FIELD OF THE INVENTION

The present invention relates to telecommunications systems in general, and more particularly to modem wake-up in support of cross-talk cancellation in a modem pool environment.

BACKGROUND OF THE INVENTION

The ever-increasing demand for high-speed data communications services and greater bandwidth is largely due to the popularity of the Internet and other data-intensive, high bandwidth applications. Both businesses and consumers are demanding higher bandwidth connections and faster Internet access. Another source for this demand is the increasing use by businesses of data communications networks, most notably the Internet, for the transmission of documents and electronic mail.

Digital Subscriber Line (DSL) technology provides one approach to addressing the demand for high-speed telecommunications service. DSL technology refers to several types of services that use advanced modem elements to transmit digital signals from a data source over copper wires. Many telephone companies have embraced DSL technology as an immediate broadband solution to serve the current demand by getting more out of their existing copper infrastructure. DSL modem elements permit high data rate transmission of data over the access segment of the public switched telephone network (PSTN) at multiple megabit speeds using sophisticated signal processing techniques that permit voice and data to travel simultaneously over the same analog copper twisted pair wire.

One of the challenges facing DSL technology is that of near-end cross-talk (NEXT) cancellation. NEXT is defined as the cross-talk interference between the receiving path and the transmitting path of different transceivers at the same end of of a communications channel that make use of wiring that shares the same cable. The NEXT effect in a cable depends on the number of interfering lines, and increases as the bandwidth that the signals occupy increases. In a modem pool environment where streams of data are distributed to many lines within a single, dedicated cable, the NEXT that the receivers need to overcome is mainly generated by the transmissions of the modem pool itself. Since such a system has access to the transmitted information for a plurality of modems, such information may be used to cancel the interference that leaks into the receivers, thus increasing the noise floor of each receiver.

Another cross-talk phenomena is known as far-end cross-talk (FEXT), which is defined as the cross-talk interference between the receiving path and the transmitting path of different transceivers at opposite ends of a communications channel that make use of wiring that shares the same cable.

In classic NEXT cancellation, a transmitter transmitting via one wire or wire grouping (e.g., twisted pair) affects the receiver receiving via another wire or wire grouping. For each transmit and receive path of an individual modem, a hybrid circuit separates the received signal from the transmitted interfering signal, but since the hybrid cannot completely separate the transmit path from the receive path, some of the transmitted signal leaks into the receiver and becomes an interfering signal. A canceller then filters out the effect of the interfering signal, resulting in a "cleaned" received signal. For a single modem, this problem may be addressed using classic echo cancellation techniques. In a modem pool environment, however, where several modems transmit via a shared cable, there are currently no techniques that effectively address how each receiver takes into account all other interfering transmitters.

In a conventional approach for NEXT cancellation in a modem pool environment, all modems on both sides of the communications channel are activated, as are all adaptive NEXT filters, and the NEXT filters are allowed to converge over time. Unfortunately, in such an approach the received signal is comprised not only of NEXT, but of the far signal, self-echo, FEXT, and other noise as well. Since self-echo and the other noise components are collectively a much bigger factor than NEXT, the NEXT filters will necessarily converge more slowly and less efficiently than were other noise components not present. Furthermore, such systems are relatively complex to implement, since the number of filters required would equal the square of the number of modems in the pool.

SUMMARY OF THE INVENTION

The present invention seeks to provide techniques for modem wake-up in a modem pool environment in support of NEXT cancellation which minimize wake-up time and ensure a correct convergence of the NEXT canceller filters. In the present invention NEXT filters are trained on NEXT power only by eliminating far signal, FEXT, and self-echo during wake-up.

In one aspect of the present invention, in a communications system having a first modem pool for communicating with a second modem pool, each modem pool including a plurality of modems and having at least one NEXT cancellation filter, a method for modem wake-up is provided including the steps of, during a first time period, a) activating at least one of the modems in the first modem pool, b) deactivating at least one of the modems in the second modem pool, for at least one target modem in the first modem pool c) activating the first modem pool NEXT canceller filter, d) measuring the NEXT transfer function for the target modem and at least one other disturber modem in the first modem pool, and, during a second time period, e) activating at least one of the modems in the second modem pool, f) deactivating at least one of the modems in the first modem pool, for at least one target modem in the second modem pool g) activating the second modem pool NEXT canceller filter, and h) measuring the NEXT transfer function for the target modem and at least one other disturber modem in the second modem pool.

In another aspect of the present invention the time periods are of an equal duration.

In another aspect of the present invention the time periods are of different durations.

In another aspect of the present invention either of the activating steps a) and e) includes activating the modems such that their transmitted signal occupies the entire usable bandwidth of the communications channel.

In another aspect of the present invention either of the activating steps a) and e) includes activating the modems at either of their maximum transmission rate and their maximum power.

In another aspect of the present invention the method further includes the steps of establishing a control channel between the modem pools, communicating a predetermined wake-up time limit from one of the modem pools to the other of the modem pools via the control channel, and setting each of the time periods to the length of the wake-up time limit.

In another aspect of the present invention the method further includes the step of setting a predetermined wake-up time limit for both of the modem pools.

In another aspect of the present invention the setting step includes setting the time limits to an equal duration.

In another aspect of the present invention the setting step includes setting the time limits to different durations.

In another aspect of the present invention the activating steps a) and e) include activating the modems at their maximum transmission rate and maximum power.

In another aspect of the present invention the measuring steps include measuring the NEXT transfer functions in either of the time domain and the frequency domain.

In another aspect of the present invention the first modem pool is located at a central office and the second modem pool is located at a remote terminal.

In another aspect of the present invention the first modem pool is located at a remote terminal and the second modem pool is located at a central office.

In another aspect of the present invention, in a communications system having a modem pool including a plurality of modems for communicating via a communications channel, the modem pool having at least one NEXT cancellation filter, a method for modem wake-up is provided, including the steps of a) activating at least one of the modems in the modem pool, b) preventing communications via the communications channel, for at least one target modem in the modem pool c) activating the modem pool NEXT canceller filter, and d) measuring the NEXT transfer function for the target modem and at least one other disturber modem in the modem pool.

In another aspect of the present invention the activating step a) includes activating the modems such that their transmitted signal occupies the entire usable bandwidth of the communications channel.

In another aspect of the present invention the activating step a) includes activating the modems at either of their maximum transmission rate and their maximum power.

In another aspect of the present invention the measuring steps include measuring the NEXT transfer functions in either of the time domain and the frequency domain.

In another aspect of the present invention the modem pool is located at either of a central office and a remote terminal.

In another aspect of the present invention, in a communications system having a first modem pool for communicating with a second modem pool, each modem pool including a plurality of modems and having at least one NEXT cancellation filter, a method for modem wake-up is provided, including the steps of, during a first time period, a) deactivating at least one of the modems in the second modem pool, for at least one target modem in the first modem in the first modem pool b) setting the target modem to receive-only mode, c) activating at least one other modem in the first modem pool, d) activating the first modem pool NEXT canceller filter, e) measuring the NEXT transfer function for the target modem and at least one other disturber modem in the first modem pool, and, during a second time period, f) deactivating at least one of the modems in the first modem pool, for at least one target modem in the second modem pool g) setting the target modem to receive-only mode, h) activating at least one other modem in the second modem pool, i) activating the second modem pool NEXT canceller filter, and j) measuring the NEXT transfer function for the target modem and at least one other disturber modem in the second modem pool.

In another aspect of the present invention either of the activating steps c) and h) includes activating the modems such that their transmitted signal occupies the entire usable bandwidth of the communications channel.

In another aspect of the present invention either of the activating steps c) and h) includes activating the modems at either of their maximum transmission rate and their maximum power.

In another aspect of the present invention the method further includes the steps of establishing a control channel between the modem pools, communicating a predetermined wake-up time limit from one of the modem pools to the other of the modem pools via the control channel, and setting each of the time periods to the length of the wake-up time limit.

In another aspect of the present invention the activating steps c) and h) include activating the modems at their maximum transmission rate and maximum power.

In another aspect of the present invention the measuring steps include measuring the NEXT transfer functions in either of the time domain and the frequency domain.

In another aspect of the present invention the first modem pool is located at a central office and the second modem pool is located at a remote terminal.

In another aspect of the present invention the first modem pool is located at a remote terminal and the second modem pool is located at a central office.

In another aspect of the present invention, in a communications system having a modem pool including a plurality of modems for communicating via a communications channel, the modem pool having at least one NEXT cancellation filter, a method for modem wake-up is provided, including the steps of, for at least one target modem in the modem pool, a) setting the target modem to receive-only mode, b) activating at least one other modem in the modem pool, c) preventing communications via the communications channel, d) activating the modem pool NEXT canceller filter, and e) measuring the NEXT transfer function for the target modem and at least one other disturber modem in the modem pool.

In another aspect of the present invention the activating step b) includes activating the modems at their maximum transmission rate and maximum power.

In another aspect of the present invention the measuring steps include measuring the NEXT transfer functions in either of the time domain and the frequency domain.

In another aspect of the present invention the modem pool is located at either of a central office and a remote terminal.

In another aspect of the present invention a communications system configured for NEXT cancellation is provided, including a communications channel, a modem pool including a plurality of modems for communicating via the communications channel, and at least one NEXT cancellation filter operative to measure the NEXT transfer function for for at least one target modem in the modem pool and at least one other disturber modem in the modem pool in the absence of communications to the modem pool via the communications channel.

In another aspect of the present invention the modems are operative to transmit a signal via the communications channel, where the signals occupy the entire usable bandwidth of the communications channel.

In another aspect of the present invention the modems are operative at either of their maximum transmission rate and their maximum power.

In another aspect of the present invention the NEXT cancellation filter is operative to measure the NEXT transfer functions in either of the time domain and the frequency domain.

In another aspect of the present invention the modem pool is located at either of a central office and a remote terminal.

In another aspect of the present invention a communications system configured for NEXT cancellation is provided, including a communications channel, a modem pool including a plurality of modems for communicating via the communications channel, and at least one NEXT cancellation filter operative to measure the NEXT transfer function for for at least one target modem in the modem pool, the target modem operating in a receive-only mode, and at least one other disturber modem in the modem pool in the absence of communications to the modem pool via the communications channel.

In another aspect of the present invention the modems are operative to transmit a signal via the communications channel, and the signals occupy the entire usable bandwidth of the communications channel.

In another aspect of the present invention the modems are operative at either of their maximum transmission rate and their maximum power.

In another aspect of the present invention the NEXT cancellation filter is operative to measure the NEXT transfer functions in either of the time domain and the frequency domain.

In another aspect of the present invention the modem pool is located at either of a central office and a remote terminal.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
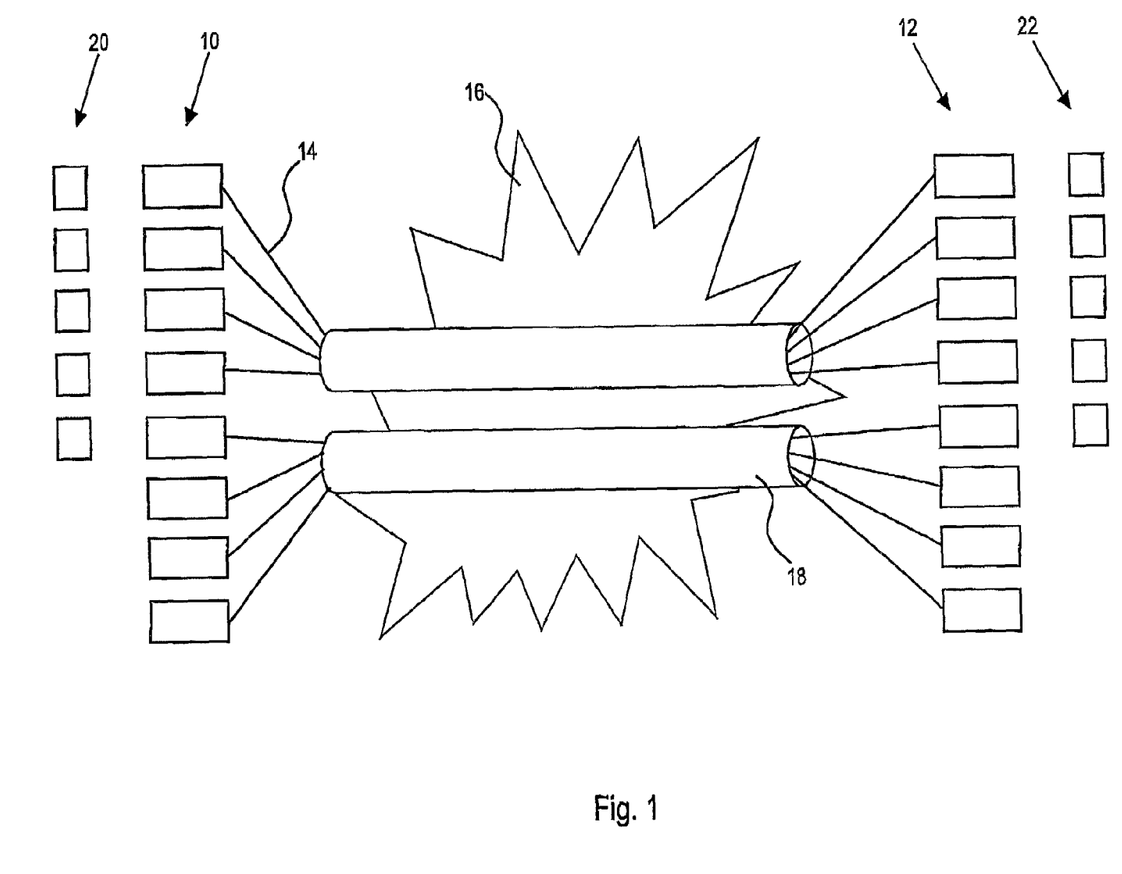
FIG. 1 is a simplified pictorial illustration of a modem pool arrangement useful in understanding the present invention.

Reference is now made to FIG. 1 which is a simplified pictorial illustration of a modem pool arrangement useful in understanding the present invention. A first modem pool, generally referenced 10, and comprising a plurality of individual modems is seen in communication with a second modem pool, generally referenced 12, via a plurality of connections 14 over a telephone network 16. Connections 14 are typically copper wire pairs arranged in one or more bundles 18. Modem pools 10 and 12 typically operate from central office (CO) and remote terminal (RT) locations respectively, and are alternatively referred to herein as CO 10 and RT 12. The modem pools preferably operate in a coordinated manner, such as is described in Applicant/assignee's U.S. patent application No. 09/510,550 filed Feb. 22, 2000, and entitled "High Speed Access System Over Copper Cable Plant," that claims priority from U.S. Provisional Application Serial No. 60/121,228, filed Feb. 23, 1999, and entitled "Access Express-Very High Data Rate Communication Channels Over Copper," both hereby incorporated by reference in their entirety.

Each modem pool in FIG. 1 typically includes one or more NEXT canceller filters 20 and 22 respectively, the operation of which is described in greater detail hereinbelow with reference to FIG. 2. It is a particular feature of the present invention that, in a modem pool of N modems, less than $N^2$ NEXT canceller filters may be used in support of NEXT cancellation.

Figure 2:
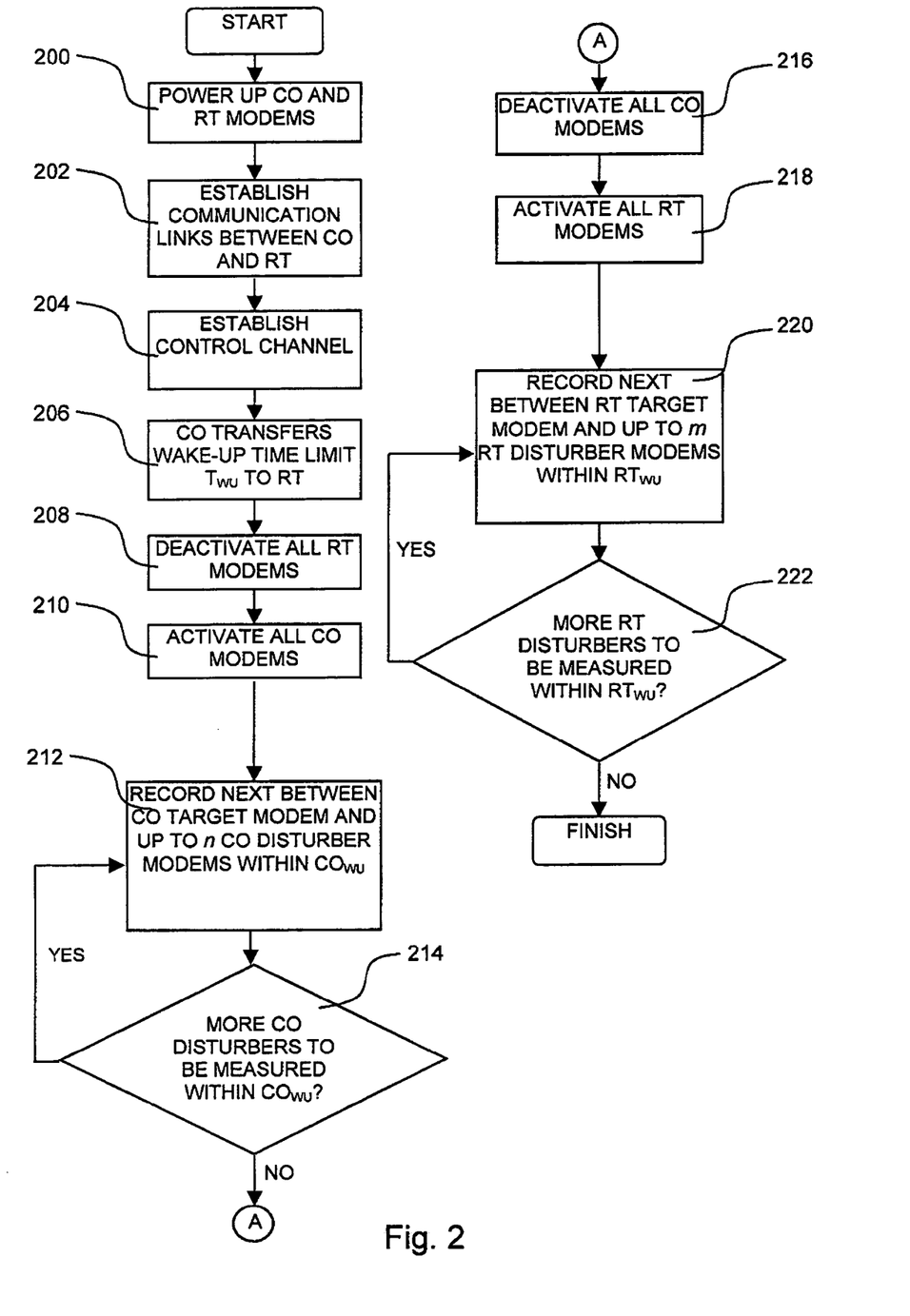
FIG. 2 is a simplified flowchart illustration of a method of modem wake-up of the system of FIG. 1, operative in accordance with a preferred embodiment of the present invention.

Reference is now made to FIG. 2, which is a simplified flowchart illustration of a method of modem wake-up of the system of FIG. 1, operative in accordance with a preferred embodiment of the present invention. In the method of FIG. 2 the modems of CO 10 and RT 12 are powered-up (step 200), and communications links are established between CO 10 and RT 12, typically at their minimum transmission rate (step 202). A system control channel is then established using at least one of the communication links (step 204). CO 10 then transfers a predetermined wake-up time limit, $T_{wu}$, to RT 12 using the control channel (step 206). Once $T_{wu}$ is received at RT 12, one or more, and preferably all, of the RT 12 modems are deactivated and thereby prevented from communicating with CO 10, typically by placing the modem in a receive-only mode or by turning the modem off (step 208).

During a first time period $T_{wu}$, referred to as $CO_{wu}$, one or more, and preferably all, of the modems at CO 10 are activated, typically such that the transmitted signal occupies the entire usable bandwidth, such as by operating at their maximum transmission rate and/or maximum power (step 210). Throughout this phase the copper lines are preferably used in a simplex mode. The n NEXT canceller filters 20 at CO 10 are activated for a single target modem, and the NEXT transfer function is measured and recorded, typically in a central database, for the target modem and each of up to n "disturber" modems of the CO 10 modem pool (step 212). Each NEXT transfer function may be measured in the time domain and/or the frequency domain, and reflects the NEXT experienced by the target modem due to a disturber modem with which the target modem is paired during the measurement. NEXT measurement may be accomplished by an adaptive FIR filter, trained to mimic the cross lines transfer function. Step 212 may be repeated for several NEXT measurement cycles, particularly where there are fewer NEXT canceller filters than disturber modems (step 214). The NEXT canceller filters 20 preferably measure different modem pairs during each cycle, provided that $CO_{wu}$ hasn't elapsed. For example, if there are 25 filters available to measure the NEXT from 100 potential disturber modems, four measurement cycles would be required for each modem being measured.

Once the $CO_{wu}$ time period has elapsed, one or more, and preferably all, of the modems at CO 10 are deactivated and thereby prevented from communicating with RT 12, typically by placing the modem in a receive-only mode or by turning the modem off (step 216), and steps 210–214 may be repeated for the modems at RT 12 for an additional $T_{wu}$ time period, referred to as $RT_{wu}$. One or more, and preferably all, of the modems at RT 12 are activated, typically such that the transmitted signal occupies the entire usable bandwidth, such as by operating at their maximum transmission rate and/or maximum power (step 218), the m NEXT canceller filters 22 at RT 12 are activated for a single target modem, and the NEXT transfer function is measured and recorded for the target modem and each of up to m disturber modems of the RT 12 modem pool (step 220), with step 220 being repeated for several NEXT measurement cycles as necessary to measure one or more, and preferably all, of target modem-disturber pairs prior to the $RT_{wu}$ time period elapsing (step 222).

The NEXT measurements taken during the wake-up process are thus free of far signal and FEXT noise components and may be subsequently used to initialize the NEXT cancellation filters when beginning normal operation. Preferably, after the method of FIG. 2 is carried out, CO 10 and RT 12 configure their modems to a stable, agreed-upon, or otherwise predetermined rate (e.g. their minimum transmission rates) and re-establish a control channel. CO 10 then activates its NEXT canceller filters for one or more, and preferably all, of its modems and instructs RT 12 to likewise activate its NEXT canceller filters for one or more, and preferably all, of its modems. The NEXT cancellation filters then converge and begin cancelling NEXT based on the NEXT transfer functions measured during wake-up. Preferred methods of NEXT cancellation are described in Assignee's U.S. Pat. No. 6,687,288 entitled Next Cancellation for Modem Pools and filed on Aug. 22, 2000 hereby incorporated by reference in its entirety.

As an alternative to steps 204 and 206 above, the time periods $T_{wu}$ or $RT_{wu}$ may be preset at RT 12, and not communicated to RT 12 by CO 10, $CO_{wu}$ may likewise be preset at CO 10. Furthermore, $CO_{wu}$ and $RT_{wu}$ need not be of equal length.

Figure 3:
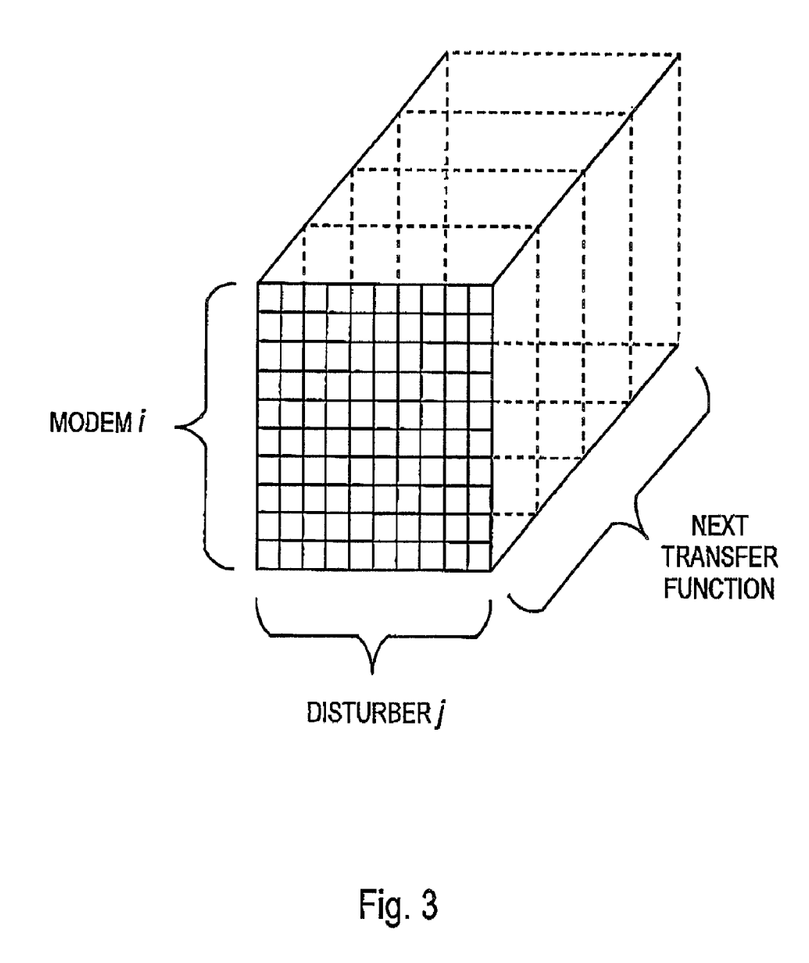
FIG. 3 is a simplified pictorial illustration of a NEXT transfer function matrix constructed using the method of FIG. 2.

Reference is now made to FIG. 3, which is a simplified pictorial illustration of a NEXT transfer function matrix constructed using the method of FIG. 2. As is shown in FIG. 3, for one or more, and preferably all, of the modems i in a modem pool, the method of FIG. 2 may be used to determine the NEXT transfer function vector for one or more, and preferably all, disturber modems j. The wake-up time limit $T_{wu}$ is preferably of a sufficient length for the complete NEXT transfer function matrix of FIG. 3 to be constructed in one or more measurement cycles as described hereinabove.

Figure 4:
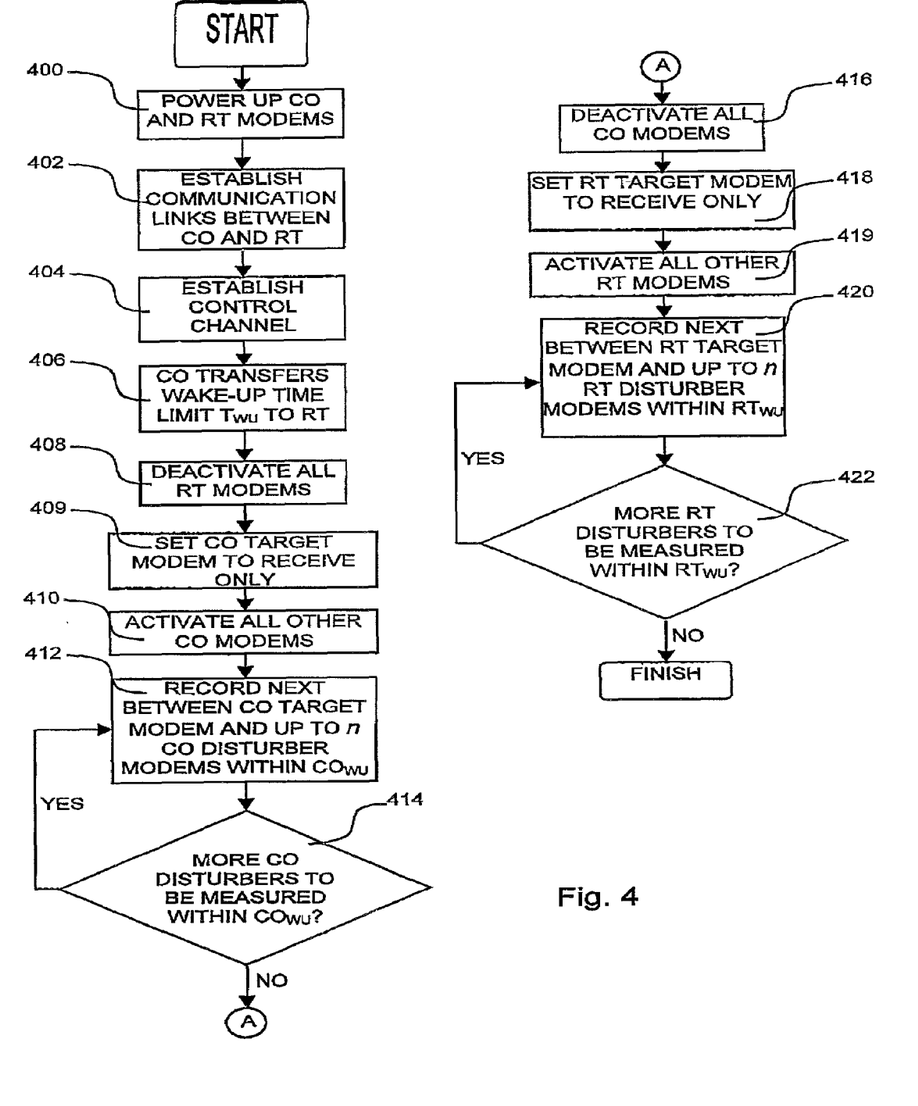
FIG. 4 is a simplified flowchart illustration of a method of modem wake-up of the system of FIG. 1, operative in accordance with a preferred embodiment of the present invention.

Reference is now made to FIG. 4, which is a simplified flowchart illustration of a method of modem wake-up of the system of FIG. 1, operative in accordance with a preferred embodiment of the present invention. The method of FIG. 4 is substantially similar to the method of FIG. 2, (with reference numerals 400–422 replacing reference numerals 200–222), with the notable exception that the target modem whose NEXT is being measured is set to receive-only mode (steps 409 and 418) while one or more, and preferably all, other modems are activated at their maximum transmission rate and maximum power (steps 410 and 419). Setting one modem to receive-only and one or more, and preferably all, potential disturbers to transmit ensures that only disturber NEXT is measured, and that the self-echo of the target modem is eliminated as a noise component.

It is appreciated that any of the methods described herein regarding CO 10 may be applied to RT 12, and that any of the methods described herein regarding RT 12 may be applied to CO 10.

It is appreciated that one or more of the steps of any of the methods described herein may be omitted or carried out in a different order than that shown, without departing from the true spirit and scope of the invention.

It is appreciated that the methods and apparatus described herein may be implemented using computer hardware and/or software using conventional techniques.

The disclosures of all patents, patent applications, and other publications mentioned in this specification and of the patents, patent applications, and other publications cited therein are hereby incorporated by reference.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. In a communications system having a first modem pool for communicating with a second modem pool via a communications channel, each modem pool comprising a plurality of modems and having at least one NEXT cancellation filter, a method for modem wake-up comprising the steps of:
during a first time period:
  a) activating at least one of the modems in said first modem pool;
  b) deactivating at least one of the modems in said second modem pool;
for at least one target modem in said first modem pool:
  c) activating said first modem pool NEXT cancellation filter;
  d) measuring a NEXT transfer function for said target modem and at least one other disturber modem in said first modem pool;
during a second time period:
  e) activating at least one of the modems in said second modem pool;
  f) deactivating at least one of the modems in said first modem pool;
for at least one target modem in said second modem pool:
  g) activating said second modem pool NEXT cancellation filter;
  h) measuring a NEXT transfer function for said second modem pool target modem and at least one other disturber modem in said second modem pool.

2. A method according to claim 1 wherein said time periods are of an equal duration.

3. A method according to claim 1 wherein said time periods are of different durations.

4. A method according to claim 1 wherein either of said activating steps a) and e) comprises activating said at least one of the modems in said first or second modem pool, respectively, such that their transmitted signal occupies the entire usable bandwidth of said communications channel.

5. A method according to claim 4 wherein either of said activating steps a) and e) comprises activating said at least one of the modems in said first or second modem pool, respectively, at either of their maximum transmission rate and their maximum power.

6. A method according to claim 1 and further comprising the steps of:
  establishing a system control channel between said modem pools;
  communicating a predetermined wake-up time limit from one of said modem pools to the other of said modem pools via said control channel; and
  setting each of said time periods to the length of said wake-up time limit.

7. A method according to claim 1 and further comprising the step of setting a predetermined wake-up time limit for both of said modem pools.

8. A method according to claim 7 wherein said setting step comprises setting said time limits to an equal duration.

9. A method according to claim 7 wherein said setting step comprises setting said time limits to different durations.

10. A method according to claim 1 wherein said activating steps a) and e) comprise activating said at least one of the modems in said first and second modem pools, at their maximum transmission rate and maximum power.

11. A method according to claim 1 wherein said measuring steps comprise measuring said NEXT transfer functions in either of the time domain and the frequency domain.

12. A method according to claim 1 wherein said first modem pool is located at a central office and wherein said second modem pool is located at a remote terminal location.

13. A method according to claim 1 wherein said first modem pool is located at a remote terminal location and wherein said second modem pool is located at a central office.

14. In a communications system having a modem pool comprising a plurality of modems for communicating via a communications channel, said modem pool having at least one NEXT cancellation filter, a method for modem wake-up comprising the steps of:
  a) activating at least one of the modems in said modem pool;
  b) preventing communications via said communications channel;
  for at least one target modem in said modem pool:
  c) activating said modem pool NEXT cancellation filter; and
  d) measuring a NEXT transfer function for said target modem and at least one other disturber modem in said modem pool.

15. A method according to claim 14 wherein said activating step a) comprises activating said at least one of the modems such that their transmitted signal occupies the entire usable bandwidth of said communications channel.

16. A method according to claim 15 wherein said activating step a) comprises activating said at least one of the modems at either of their maximum transmission rate and their maximum power.

17. A method according to claim 14 wherein said measuring step comprises measuring said NEXT transfer function in either of the time domain and the frequency domain.

18. A method according to claim 14 wherein said modem pool is located at either of a central office and a remote terminal location.

19. In a communications system having a first modem pool for communicating with a second modem pool via a communications channel, each modem pool comprising a plurality of modems and having at least one NEXT cancellation filter, a method for modem wake-up comprising the steps of:
  during a first time period:
    a) deactivating at least one of the modems in said second modem pool;
    for at least one target modem in said first modem pool:
    b) setting said target modem to receive-only mode;
    c) activating at least one other modem in said first modem pool;
    d) activating said first modem pool NEXT cancellation filter;
    e) measuring a NEXT transfer function for said target modem and at least one other disturber modem in said first modem pool;
  during a second time period:
    f) deactivating at least one of the modems in said first modem pool;
    for at least one target modem in said second modem pool:
    g) setting said target modem to receive-only mode;
    h) activating at least one other modem in said second modem pool;
    i) activating said second modem pool NEXT cancellation filter; and
    j) measuring a NEXT transfer function for said second modem pool target modem and at least one other disturber modem in said second modem pool.

20. A method according to claim 19 wherein either of said activating steps c) and h) comprises activating said at least one other modem in said first or second modem pool, respectively, such that their transmitted signal occupies the entire usable bandwidth of said communications channel.

21. A method according to claim 20 wherein either of said activating steps c) and h) comprises activating said at least one other modem in said first or second modem pool, respectively, at either of their maximum transmission rate and their maximum power.

22. A method according to claim 19 and further comprising the steps of:
  establishing a system control channel between said modem pools;
  communicating a predetermined wake-up time limit from one of said modem pools to the other of said modem pools via said control channel; and
  setting each of said time periods to the length of said wake-up time limit.

23. A method according to claim 19 wherein said activating steps c) and h) comprise activating said at least one other modem in said first and second modem pools at their maximum transmission rate and maximum power.

24. A method according to claim 19 wherein said measuring steps comprise measuring said NEXT transfer functions in either of the time domain and the frequency domain.

25. A method according to claim 19 wherein said first modem pool is located at a central office and wherein said second modem pool is located at a remote terminal location.

26. A method according to claim 19 wherein said first modem pool is located at a remote terminal location and wherein said second modem pool is located at a central office.

27. In a communications system having a modem pool comprising a plurality of modems for communicating via a communications channel, said modem pool having at least one NEXT cancellation filter, a method for modem wake-up comprising the steps of:
  for at least one target modem in said modem pool;
    a) setting said target modem to receive-only mode;
    b) activating at least one other modem in said modem pool;
    c) preventing communications via said communications channel;

d) activating said modem pool NEXT cancellation filter; and
e) measuring a NEXT transfer function for said target modem and at least one other disturber modem in said modem pool.

28. A method according to claim 27 wherein said activating step b) comprises activating said at least one other modem at their maximum transmission rate and maximum power.

29. A method according to claim 27 wherein said measuring step comprises measuring said NEXT transfer function in either of the time domain and the frequency domain.

30. A method according to claim 27 wherein said modem pool is located at either of a central office and a remote terminal location.

31. A communications system configured for NEXT cancellation, comprising:
a communications channel;
a modem pool comprising a plurality of modems for communicating via said communications channel wherein said modems are operative to transmit a signal via said communications channel, wherein said signal occupies the entire usable bandwidth of said communications channel; and
at least one NEXT cancellation filter operative to measure a NEXT transfer function for at least one target modem in said modem pool and at least one other disturber modem in said modem pool in the absence of communications to said modem pool via said communications channel.

32. A communications system configured for NEXT cancellation, comprising:
a communications channel;
a modem pool comprising a plurality of modems for communicating via said communications channel wherein said modems are operative at either of their maximum transmission rate and their maximum power; and
at least one NEXT cancellation filter operative to measure a NEXT transfer function for at least one target modem in said modem pool and at least one other disturber modem in said modem pool in the absence of communications to said modem pool via said communications channel.

33. A communications system configured for NEXT cancellation, comprising:
a communications channel;
a modem pool comprising a plurality of modems for communicating via said communications channel; and
at least one NEXT cancellation filter operative to measure a NEXT transfer function for at least one target modem in said modem pool, said target modem operating in a receive-only mode, and at least one other disturber modem in said modem pool in the absence of communications to said modem pool via said communications channel.

34. A system according to claim 33 wherein said modems are operative to transmit a signal via said communications channel, wherein said signal occupies the entire usable bandwidth of said communications channel.

35. A system according to claim 34 wherein said modems are operative at either of their maximum transmission rate and their maximum power.

36. A system according to claim 33 wherein said NEXT cancellation filter is operative to measure said NEXT transfer function in either of the time domain and the frequency domain.

37. A system according to claim 33 wherein said modem pool is located at either of a central office and a remote terminal location.

* * * * *